(12) United States Patent
Anwei et al.

(10) Patent No.: US 9,062,998 B2
(45) Date of Patent: Jun. 23, 2015

(54) METHOD FOR DETERMINING A SIZE OF AN ELECTRONIC APPARATUS USED FOR AN EXTERNAL APPARATUS, AND ELECTRONIC APPARATUS

(75) Inventors: Zhou Anwei, Hanzhong (CN); Yu Ruixin, Hanzhong (CN); Ge Lilong, Hanzhong (CN)

(73) Assignee: Kabushiki Kaisha Toshiba, Tokyo (JP)

( * ) Notice: Subject to any disclaimer, the term of this patent is extended or adjusted under 35 U.S.C. 154(b) by 352 days.

(21) Appl. No.: 13/587,355

(22) Filed: Aug. 16, 2012

(65) Prior Publication Data
US 2013/0160534 A1 Jun. 27, 2013

(30) Foreign Application Priority Data

Dec. 27, 2011 (CN) .......................... 2011 1 0445854

(51) Int. Cl.
G01G 19/414 (2006.01)
G06F 1/16 (2006.01)

(52) U.S. Cl.
CPC ............ *G01G 19/414* (2013.01); *G06F 1/1632* (2013.01)

(58) Field of Classification Search
CPC .......................... G01G 19/414; G01G 1/1632
USPC ..... 73/65.01, 382 R, 483, 382 G; 361/679.01
See application file for complete search history.

(56) References Cited

U.S. PATENT DOCUMENTS

| | | | |
|---|---|---|---|
| 3,640,228 A * | 2/1972 | Busse | 108/6 |
| 4,715,458 A * | 12/1987 | De Angelis et al. | 177/172 |
| 5,081,865 A * | 1/1992 | Schechter et al. | 73/65.07 |
| 2001/0022719 A1* | 9/2001 | Armitage et al. | 361/681 |
| 2004/0057199 A1* | 3/2004 | Azuchi | 361/683 |
| 2006/0158844 A1* | 7/2006 | Lee | 361/687 |
| 2007/0186626 A1* | 8/2007 | Latiri | 73/65.01 |
| 2011/0083334 A1* | 4/2011 | Eley | 33/503 |
| 2011/0164375 A1* | 7/2011 | Hayashida et al. | 361/679.41 |
| 2011/0181687 A1* | 7/2011 | Yoshizumi | 348/36 |
| 2011/0267773 A1* | 11/2011 | Macfarlane | 361/679.55 |
| 2012/0162437 A1* | 6/2012 | Azuchi | 348/159 |

FOREIGN PATENT DOCUMENTS

| | | |
|---|---|---|
| JP | 2003-204380 | 7/2003 |
| JP | 2003-309637 | 10/2003 |
| JP | 2007-066334 | 3/2007 |

* cited by examiner

*Primary Examiner* — Lisa Caputo
*Assistant Examiner* — Philip Cotey
(74) *Attorney, Agent, or Firm* — Knobbe Martens Olson & Bear LLP

(57) ABSTRACT

According to at least one embodiment, the embodiment provides a method for determining a size of an electronic apparatus. The electronic apparatus includes a connector for electrically connecting to an external apparatus, and a supporting plate for supporting a back surface of the external apparatus. The method includes determining a minimal length of the electronic apparatus by balancing moment of forces on a first fulcrum according to a first acting force, a gravity of the external apparatus and a length of the external apparatus in a condition that the external apparatus does not rotate with respect to the electronic apparatus.

4 Claims, 6 Drawing Sheets

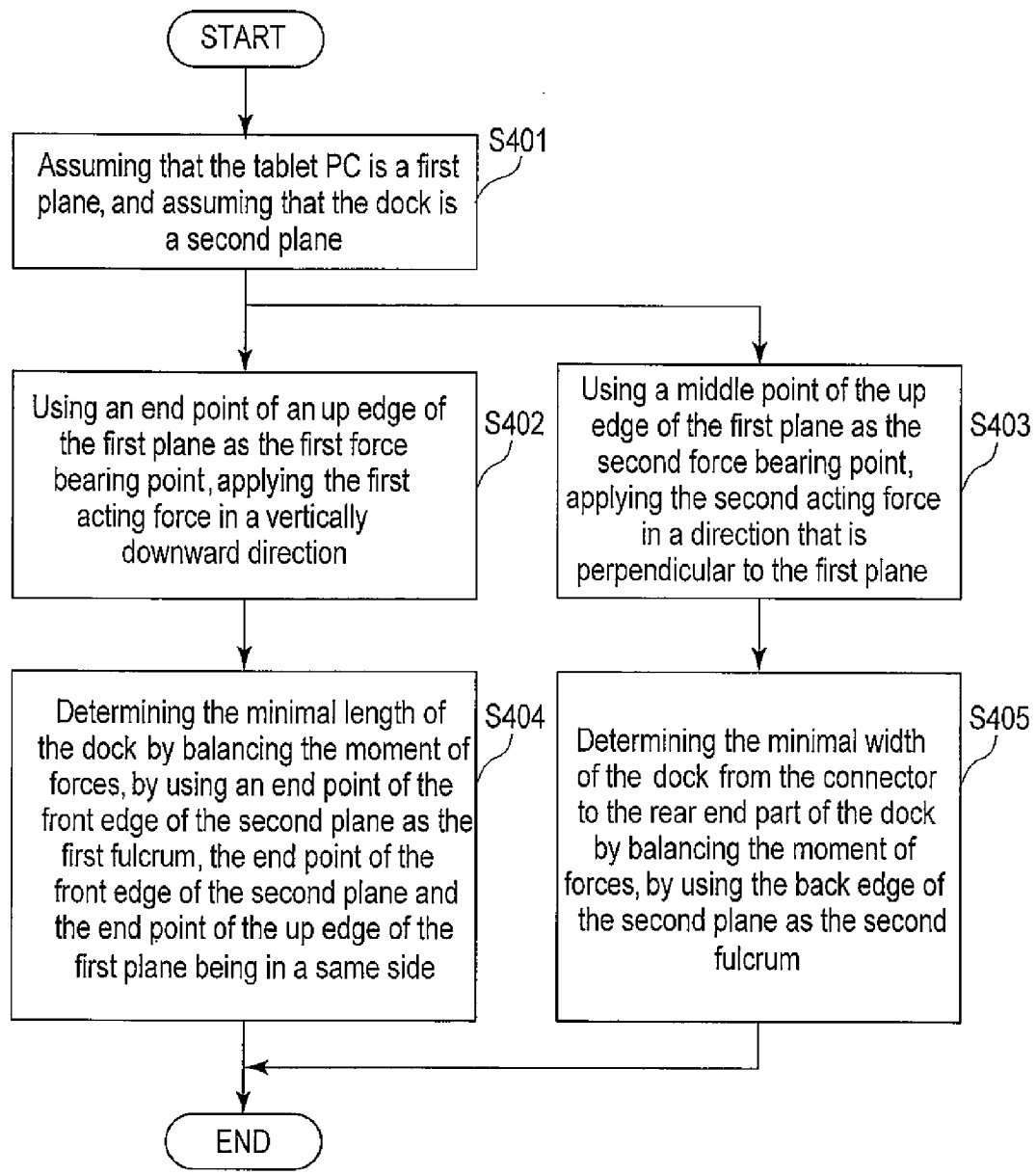
F I G. 10

METHOD FOR DETERMINING A SIZE OF AN ELECTRONIC APPARATUS USED FOR AN EXTERNAL APPARATUS, AND ELECTRONIC APPARATUS

CROSS-REFERENCE TO RELATED APPLICATIONS

This application is based upon and claims the benefit of priority from prior Chinese Patent Application No. 201110445854.7, filed Dec. 27, 2011, the entire contents of which are incorporated herein by reference.

FIELD

Embodiments described herein relate generally to an electronic apparatus, for example, used for an external apparatus, and relates to a method for determining a size of the electronic apparatus, for example, used for an external apparatus.

BACKGROUND

Since external apparatuses such as tablet PCs, notebook PCs, cellular phones, televisions, etc, are small in volume and light in weight, they can present good features in carrying and moving. However, theses external apparatuses are made into a light, thin and compact configuration, thus, as compared with desktop computers, their extension is not good. The extension means extended function, such as printing, scanning, modulating, demodulating, reading data from various mediums, etc. In order to be connected to external devices such as printers, scanners, modulator, demodulator, CD-ROMs, etc, it is necessary to provide interfaces corresponding to these devices respectively on the external apparatuses. But in the external apparatuses required to be miniaturization, it is hardly to insure spaces for these interfaces. Therefore, aiming at such disadvantage, it has developed an electronic apparatus used for extending functions of an external apparatus. The electronic apparatus is, for example, a dock, an external connection device, a cradle, a holding device and a supporting device, etc. When the external apparatus is used indoors, the external apparatus is put onto the electronic apparatus. Thus, a connector of the external apparatus is electrically connected to a connector of the electronic apparatus so as to achieve interchanging of data. It can extend the functions of the external apparatus by connecting the electronic apparatus to various external devices.

In order to stably lay the external apparatus on the electronic apparatus and to reduce manufacturing cost of the electronic apparatus, there is a requirement for limiting the size of the electronic apparatus. If a length size of the electronic apparatus is not long enough, the external apparatus will be overturned with respect to the electronic apparatus when a user presses the external apparatus, so that a connector of the external apparatus will get out of electrical connection with a connector interface of the electronic apparatus. If a width size of the electronic apparatus is not wide enough, the external apparatus will be overturned with the electronic apparatus when a user presses the external apparatus. In other words, at this time, the external apparatus can not be stably laid on the electronic apparatus. If the length size and/or the width size of the electronic apparatus are too great, although the external apparatus can be stably laid on the electronic apparatus, the manufacturing cost will be increased.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 10 shows an exemplary flow chart for further determining a size of the dock according to the third embodiment.

DETAILED DESCRIPTION

Figure 1:
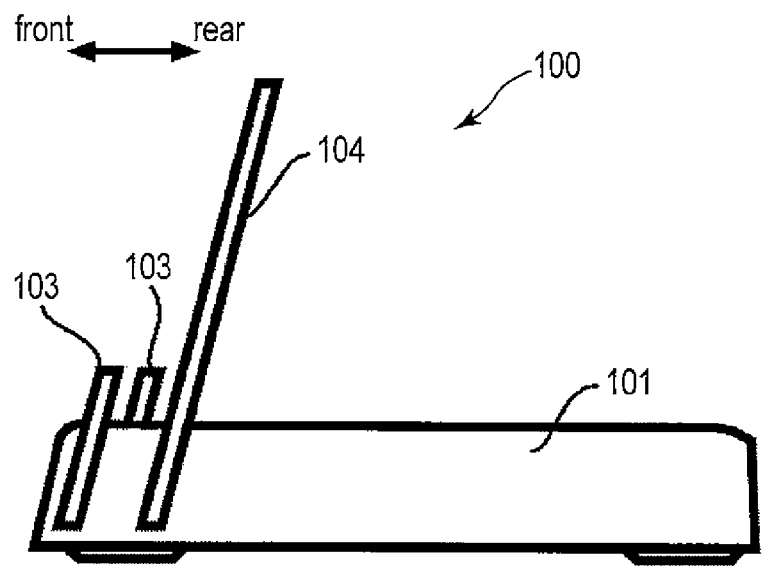
FIG. 1 shows an exemplary side view of a dock according to embodiments.

Various embodiments will be described hereinafter with reference to the accompanying drawings.

In general, according to one embodiment, the embodiment provides a method for determining a size of an electronic apparatus used for an external apparatus. The method utilizes a principle of balancing moment of forces to determine a suitable size of the electronic apparatus so as to reduce the manufacturing cost of the electronic apparatus.

The embodiment provides a method for determining a size of an electronic apparatus used for an external apparatus, the electronic apparatus comprising a connector for electrically connecting to the external apparatus, and a supporting plate for supporting a back surface of the external apparatus when a bottom part of the external apparatus is mounted on the electronic apparatus via the connector, wherein, the method comprises following steps:

determining a minimal length of the electronic apparatus by balancing moment of forces on a first fulcrum according to a first acting force, a gravity of the external apparatus and a length of the external apparatus in a condition that the external apparatus does not rotate with respect to the electronic apparatus, the first fulcrum being located on an edge of a side surface of the electronic apparatus which contacts with the external apparatus at a side on which the first acting force locates.

The method further comprises: simulating the first acting force which is applied by a user on a first force bearing point of the external apparatus in a vertically downward direction, the first force bearing point being located on a side end part in a longitudinal direction of a top surface of the external apparatus.

With the above method, a length size of the electronic apparatus for stably laying the external apparatus can be determined accurately, thereby the manufacturing cost of the electronic apparatus is reduced.

The method further comprises: determining a minimal width of the electronic apparatus from the connector on a front part of the electronic apparatus to a rear end part of the electronic apparatus by balancing moment of forces on a second fulcrum according to a second acting force, a gravity of the electronic apparatus, a gravity of the external apparatus and a height of the external apparatus in a condition that the external apparatus and the electronic apparatus as a whole do not rotate, the second fulcrum being located on a rear edge of a bottom surface of the electronic apparatus.

The method further comprises: simulating the second acting force which is applied by the user on a second force bearing point of the external apparatus in a direction that intersects with a front surface of the external apparatus, the second force bearing point being located on a central part of a top edge of the front surface of the external apparatus.

With the above method, a width size of the electronic apparatus for stably laying the external apparatus can be determined accurately, thereby the manufacturing cost of the electronic apparatus is further reduced.

Moreover, the method further comprises:

assuming that the external apparatus is a first plane, the first plane being a plane that is parallel to the back surface of the external apparatus and on which a central plane in a longitudinal direction of the connector locates, the first plane being a rectangle shape which has an up edge, a down edge and two side edges;

assuming that the electronic apparatus is a second plane, the second plane being a plane that includes the top surface of the electronic apparatus, an angle between the first plane and the second plane being an acute angle θ, the second plane being a rectangle shape which has a front edge, a back edge and two side edges, the front edge of the second plane being overlapped with the down edge of the first plane;

using an end point of the up edge of the first plane as the first force bearing point, applying the first acting force F1 in a vertically downward direction, and determining the minimal length L of the electronic apparatus: L≥F1·Lp/(Gp+F1) by balancing the moment of forces, by using an end point of the front edge of the second plane as the first fulcrum, the end point of the front edge of the second plane and the end point of the up edge of the first plane being in a same side, wherein, Lp indicates the length of the external apparatus, Gp indicates the gravity of the external apparatus;

using a middle point of the up edge of the first plane as the second force bearing point, applying the second acting force F2 in a direction that is perpendicular to the first plane, and determining the minimal width W of the electronic apparatus from the connector to the rear end part of the electronic apparatus: W≥(Gp·Hp·cos θ−2·F2·Hp·sin θ)/(Gd+Gp) by balancing the moment of forces, by using the back edge of the second plane as the second fulcrum, wherein, Gd indicates the gravity of the electronic apparatus, Gp indicates the gravity of the external apparatus, Hp indicates the height of the external apparatus.

With the above method, a length size and a width size of the electronic apparatus for stably laying the external apparatus can be determined accurately, thereby the manufacturing cost of the electronic apparatus is reduced greatly.

A method for determining a size of a electronic apparatus used for a external apparatus, the electronic apparatus comprising a connector for electrically connecting to the external apparatus, and a supporting plate for supporting a back surface of the external apparatus when a bottom part of the external apparatus is mounted on the electronic apparatus via the connector, wherein, the method comprises following steps:

determining a minimal width of the electronic apparatus from the connector on a front part of the electronic apparatus to a rear end part of the electronic apparatus by balancing moment of forces on a second fulcrum according to a second acting force, a gravity of the electronic apparatus, a gravity of the external apparatus and a length of the external apparatus in a condition that the external apparatus and the electronic apparatus as a whole do not rotate, the second fulcrum being located on a rear edge of a bottom surface of the electronic apparatus.

With the above method, a width size of the electronic apparatus for stably laying the external apparatus can be determined accurately, thereby the manufacturing cost of the electronic apparatus is reduced.

An electronic apparatus has the minimal length determined by the method.

An electronic apparatus has the minimal width determined by the method.

Embodiments will be described in details hereinafter with reference to the accompanying drawings.

In following embodiments, an example of the electronic apparatus is a dock 100 and an example of the external apparatus is a tablet PC 200. However, embodiments are not limited thereto. For example, the electronic apparatus also can be an external connection device, a cradle, a holding device and a supporting device and the like, and the external apparatus can be a notebook PC, a cellular phone, a portable television and the like.

FIG. 1 shows an exemplary side view of the dock 100. As shown in FIG. 1, the dock 100 comprises a main body portion 101, a connector 102, a front supporting plate 103 and a rear supporting plate 104. The connector 102 is provided on a front part of the main body portion 101 of the dock 100. The front supporting plate 103 protrudes from a top surface of the main body portion 101 and locates in front of the connector 102. The rear supporting plate 104 protrudes from the top surface of the main body portion 101 and locates behind the connector 102. The rear supporting plate 104 is higher than the front supporting plate 103.

Figure 2:
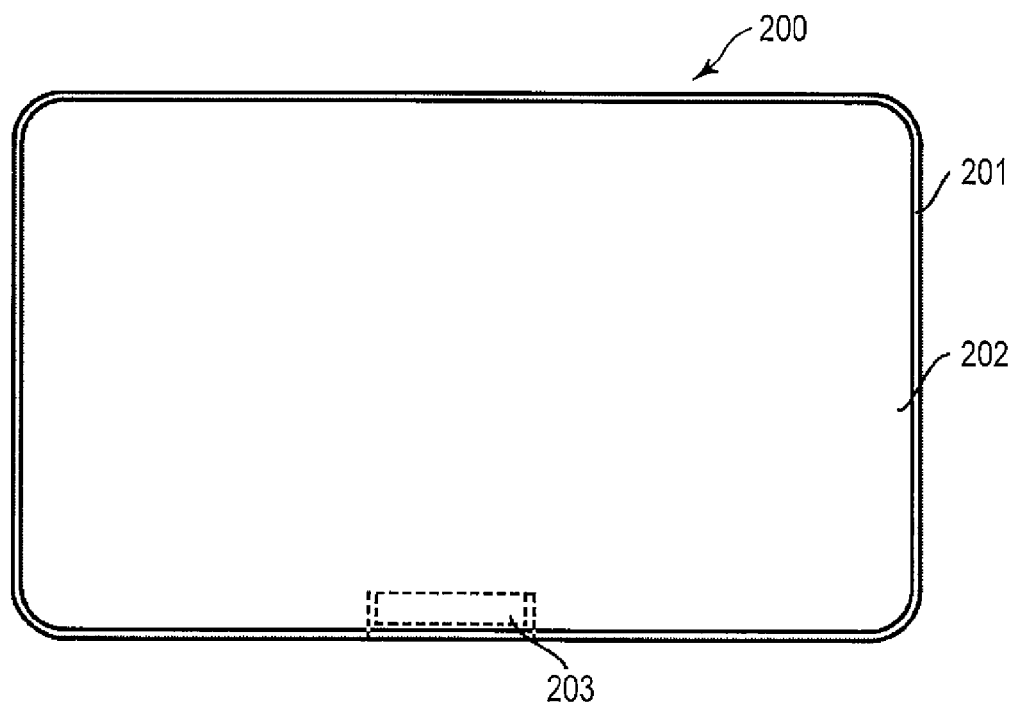
FIG. 2 shows an exemplary front view of a tablet PC according to the embodiments.

FIG. 2 shows an exemplary front view of the tablet PC 200. As shown in FIG. 2, the tablet PC 200 comprises a housing 201 having an opening, a display screen 202 exposed to outside of the housing 201 through the opening in front of the housing 201, and a connector 203 provided within the housing 201 and exposed from an opening located at center of a bottom part of the housing 201. The connector 203 is connected to a circuit board (not shown) provided in the housing 201.

Different types of the tablet PC 200 have different sizes and different weights. For example, following Table 1 gives several detailed examples of the tablet PC 200.

TABLE 1

| Type of the Tablet PC | Length (mm) | Width (mm) | Thickness (mm) | Weight (g) |
|---|---|---|---|---|
| Blade | 255.6 | 175.6 | 7.7 | 565 |
| Sphinx | 204.5 | 135.2 | 7.85 | 380 |
| Avalon | 260.6 | 178.9 | 9 | 600 |
| Antares | 253 | 172 | 9.9 | 730 |
| Rhodes | 270 | 173 | 14.5 | 760 |
| Scorpio II | 235 | 156 | 8.5 | 450 |

The detailed example of the tablet PC 200 is not limited to the above examples shown by Table 1.

Although different types of the tablet PC 200 have different sizes and different weights, different types of the tablet PC 200 have the same connector 203. Further, different types of the tablet PC not only can use different docks 100 suitable for respective tablet PC, but also can commonly use a same dock 100.

Figure 3:
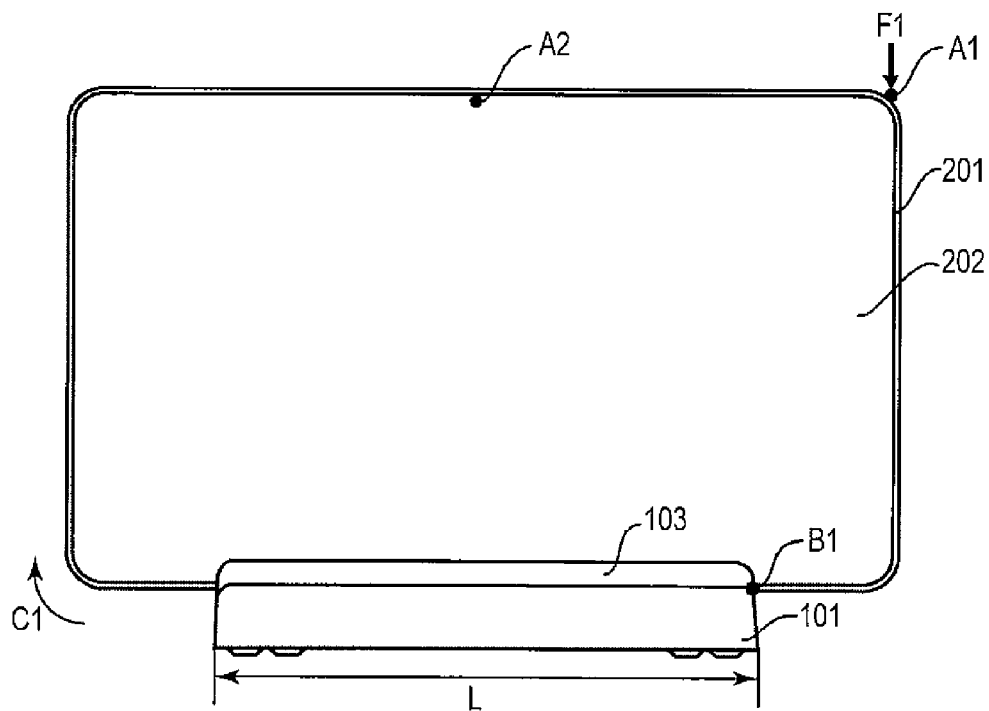
FIG. 3 shows an exemplary front view of a dock mounted with a tablet PC according to the embodiments.
Figure 4:
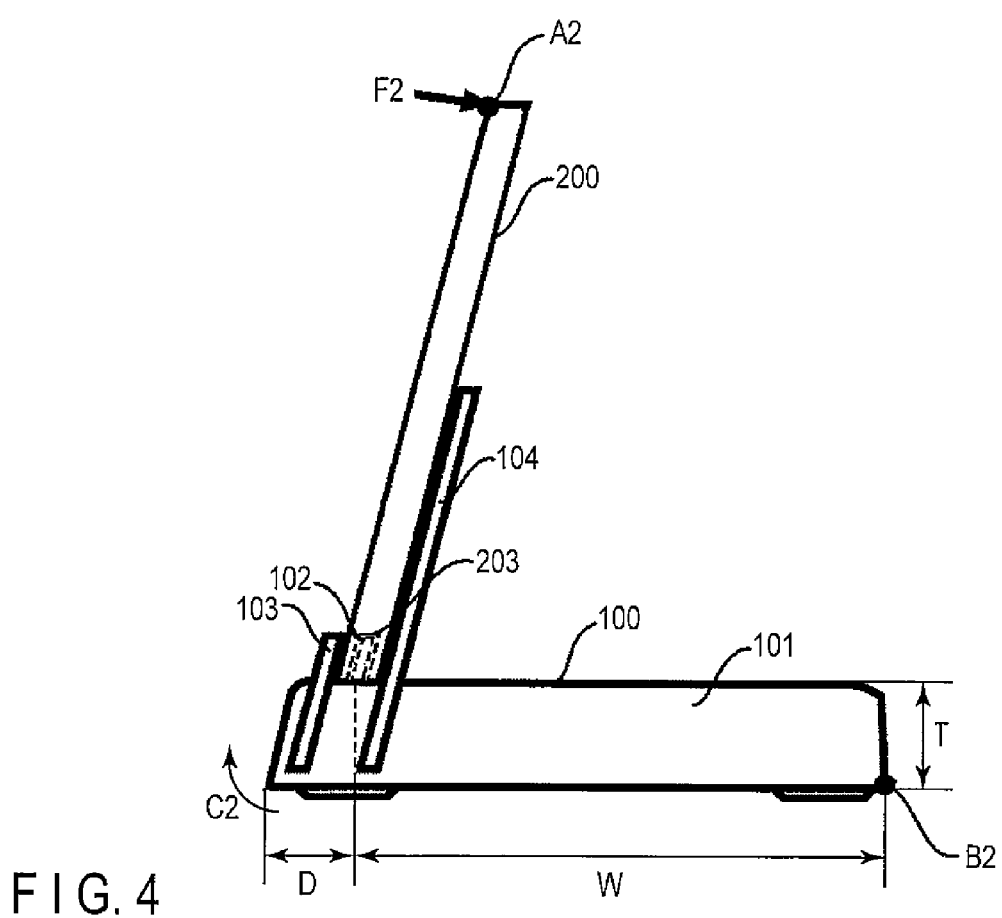
FIG. 4 shows an exemplary side view of a dock mounted with a tablet PC according to the embodiments.

Hereinafter, a structure that the tablet PC 200 is mounted on the dock 100 will be described with reference to FIGS. 3 and 4. FIG. 3 shows an exemplary front view of the dock 100 mounted with the tablet PC 200. FIG. 4 shows an exemplary side view of the dock 100 mounted with the tablet PC 200.

As shown in FIGS. 3 and 4, the tablet PC 200 is mounted between the front supporting plate 103 and the rear supporting plate 104. The front supporting plate 103 of the dock 100 contacts a lower part of a front surface of the tablet PC 200 to prevent the tablet PC 200 from toppling onwards. The rear supporting plate 104 of the dock 100 contacts a back surface of the tablet PC 200 to support the tablet PC 200. The connector 203 of the tablet PC 200 and the connector 102 of the dock 100 are inserted with each other to realize an electrical connection. The tablet PC 200 and the dock 100 exchange data via the electrical connection between the connector 203 and the connector 102.

As shown in FIG. 3, when an acting force F1 with ordinary magnitude is applied on a side end part of a top surface of the tablet PC 200 in a vertically downward direction, if a length L of the dock 100 is too short, the tablet PC 200 will rotate in a direction indicated by arrow C1 with respect to the dock 100, so that the connector 203 of the tablet PC 200 will get out of electrical connection with the connector 102 of the dock 100. At this time, the tablet PC 200 will not be stably laid on the dock 100.

Figure 5:
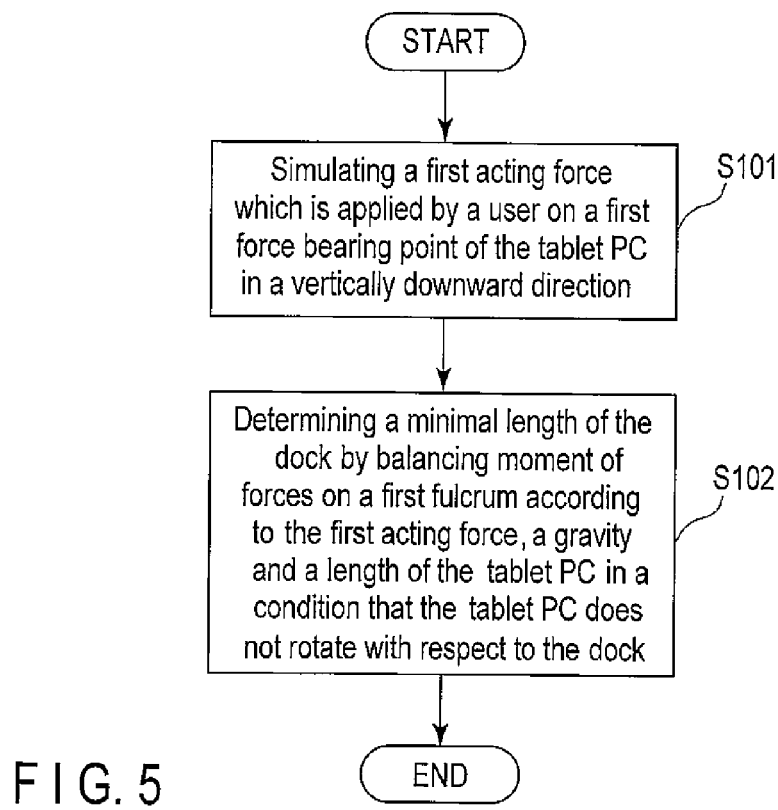
FIG. 5 shows an exemplary flow chart for determining a size of a dock according to a first embodiment.

In order to solve this problem, under a precondition that the tablet PC 200 is mounted on the dock 100, the present embodiment provides a method for determining a size of the dock 100 used for the tablet PC 200. FIG. 5 shows a flow chart for determining the size of the dock according to a first embodiment.

As shown in FIG. 5, at first, a first acting force F1 which is applied by a user on a first force bearing point A1 of the tablet PC 200 in a vertically downward direction is simulated (step S101). As shown in FIG. 3, the first force bearing point A1 locates on a side end part (left side end part or right side end part) in a longitudinal direction of the top surface of the tablet PC 200. In present embodiment, the first force bearing point A1 locates on the right side end part in a longitudinal direction of the top surface of the tablet PC 200.

Then, a minimal length L of the dock 100 is determined by balancing moment of forces on a first fulcrum B1 according to the first acting force F1, a gravity of the tablet PC 200 and a length of the tablet PC 200 in a condition that the tablet PC 200 does not rotate with respect to the dock 100 (step S102). The first fulcrum B1 locates on an edge of a side surface of the dock 100 which contacts with the tablet PC 200 at a side on which the first acting force F1 locates. For example, in present embodiment, as shown in FIG. 3, since the first force bearing point A1 acts on the right side end part in a longitudinal direction of the top surface of the tablet PC 200, the first fulcrum B1 locates on the edge of the right side surface of the dock 100 which contacts with the tablet PC 200. On the other hand, if the first force bearing point A1 acts on the left side end part in a longitudinal direction of the top surface of the tablet PC 200, the first fulcrum B1 locates on the edge of the left side surface of the dock 100 which contacts with the tablet PC 200.

With the above method, the length size of the dock 100 for stably laying the tablet PC 200 can be determined accurately, thereby the manufacturing cost of the dock 100 is reduced.

Further, as shown in FIG. 4, when an acting force F2 with ordinary magnitude is applied on a top edge of the front surface of the tablet PC 200 in a direction that intersects with the front surface of the tablet PC 200, if a width W of the dock 100 is too short, the tablet PC 200 will rotate in a direction indicated by arrow C2 with the dock 100, so that it is disadvantage for the user to use the tablet PC 200. At this time, the tablet PC 200 also will not be stably laid on the dock 100.

Figure 6:
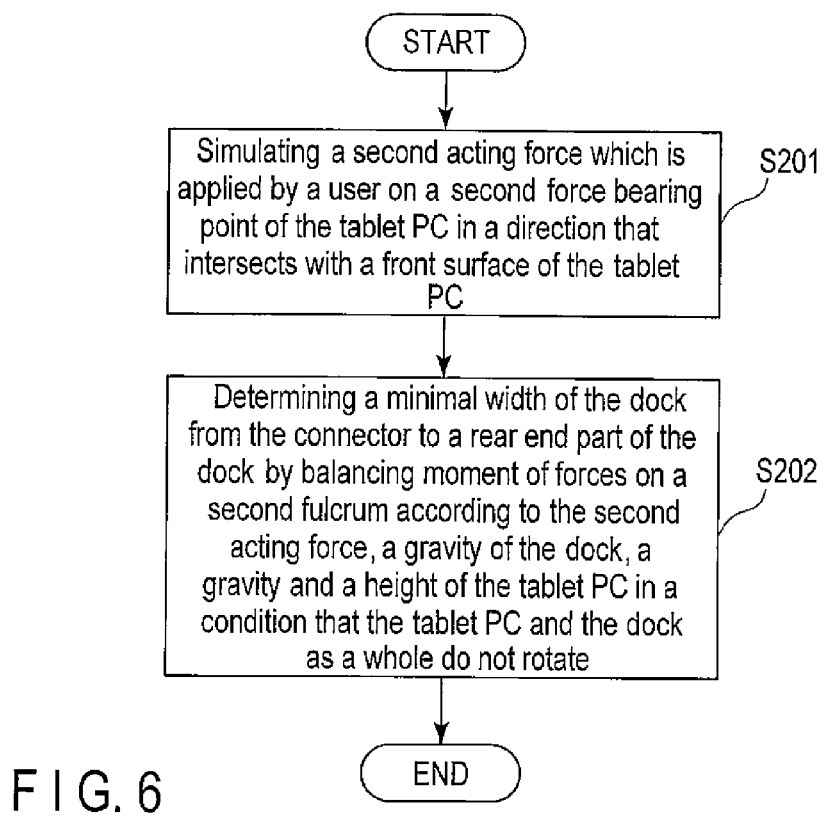
FIG. 6 shows an exemplary flow chart for determining a size of a dock according to a second embodiment.

In order to solve this problem, under a precondition that the tablet PC 200 is mounted on the dock 100, the present embodiment provides a method for determining a size of the dock 100 used for the tablet PC 200. FIG. 6 shows a flow chart for determining the size of the dock according to a second embodiment.

As shown in FIG. 6, at first, a second acting force F2 which is applied by the user on a second force bearing point A2 of the tablet PC 200 in a direction that intersects with the front surface of the tablet PC 200 is simulated (step S201). As shown in FIGS. 3 and 4, the second force bearing point A2 locates on a central part of the top edge of the front surface of the tablet PC 200.

Then, a minimal width W of the dock 100 from the connector 102 on the front part of the dock 100 to a rear end part of the dock 100 is determined by balancing moment of forces on a second fulcrum B2 according to the second acting force F2, a gravity of the dock 100, the gravity of the tablet PC 200 and a height (i.e. width) of the tablet PC 200 in a condition that the tablet PC 200 and the dock 100 as a whole do not rotate (step S202). The second fulcrum B2 locates on a rear edge of a bottom surface of the dock 100.

With the above method, the width size of the dock 100 from the connector 102 to the rear end part of the dock 100 for stably laying the tablet PC 200 can be determined accurately, thereby the manufacturing cost of the dock 100 is reduced.

Figure 7:
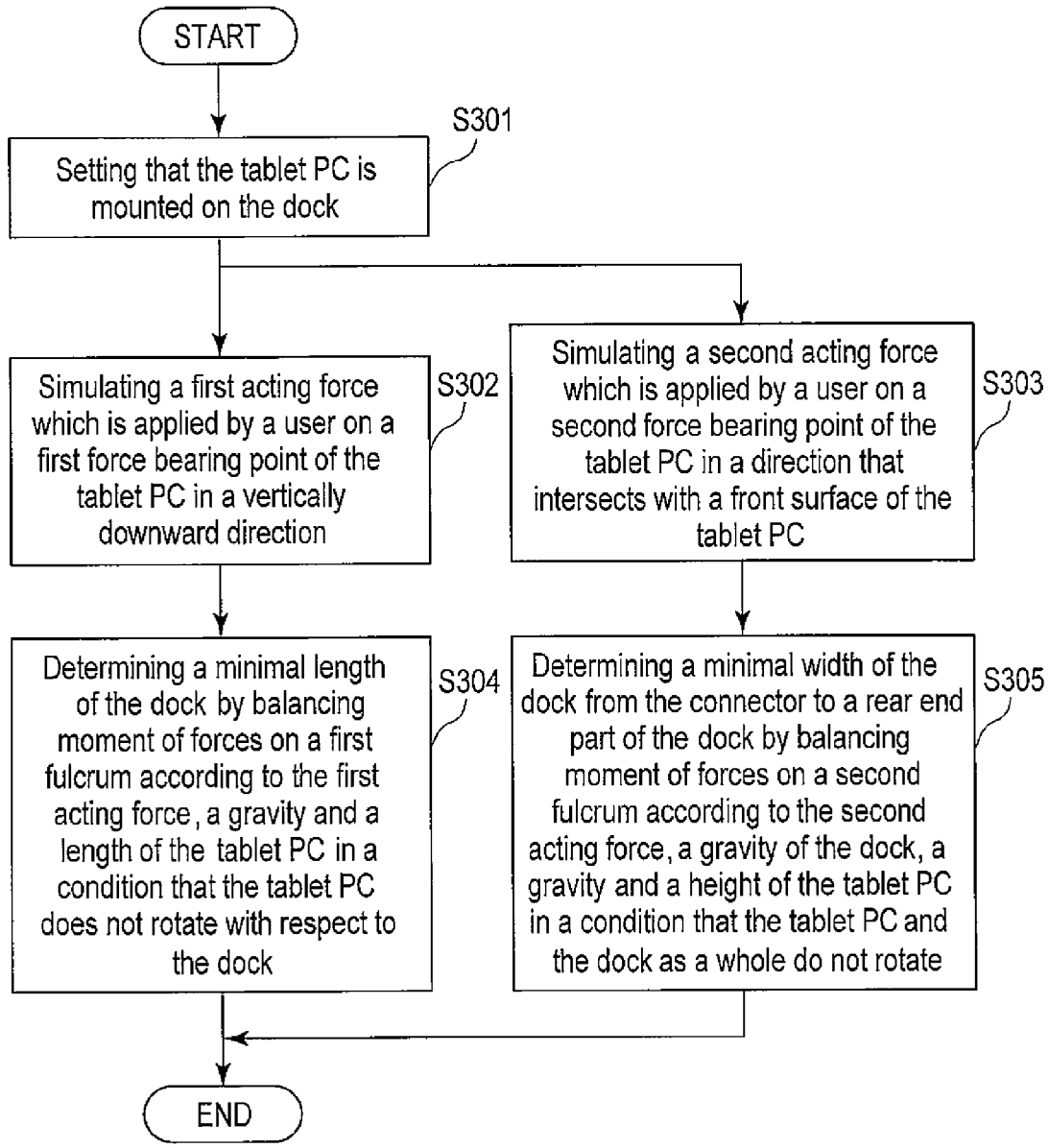
FIG. 7 shows an exemplary flow chart for determining a size of a dock according to a third embodiment.

Hereinafter, a third embodiment of a method for determining the size of the dock 100 used for the tablet PC 200 will be described with reference to FIGS. 3, 4 and 7. FIG. 7 shows a flow chart for determining the size of the dock 100 according to the third embodiment.

As shown in FIG. 7, the method for determining the size of the dock 100 used for the tablet PC 200 comprises following steps:

Firstly, the tablet PC 200 is set to be mounted on the dock 100 (step S301).

Then, a first acting force F1 which is applied by a user on a first force bearing point A1 of the tablet PC 200 in a vertically downward direction is simulated (step S302), and a second acting force F2 which is applied by the user on a second force bearing point A2 of the tablet PC 200 in a direction that intersects with the front surface of the tablet PC 200 is simulated (step S303). As shown in FIG. 3, the first force bearing point A1 locates on a side end part (left side end part or right side end part) in a longitudinal direction of a top surface of the tablet PC 200. In present embodiment, the first force bearing point A1 locates on the right side end part in a longitudinal direction of the top surface of the tablet PC 200. As shown in FIGS. 3 and 4, the second force bearing point A2 locates on a central part of the top edge of the front surface of the tablet PC 200.

Then, a minimal length L of the dock 100 is determined by balancing moment of forces on a first fulcrum B1 according to the first acting force F1, a gravity of the tablet PC 200 and a length of the tablet PC 200 in a condition that the tablet PC 200 does not rotate with respect to the dock 100 (step S304). The first fulcrum B1 locates on an edge of a side surface of the dock 100 which contacts with the tablet PC 200 at a side on which the first acting force F1 locates. For example, in present embodiment, as shown in FIG. 3, since the first force bearing point A1 acts on the right side end part in a longitudinal direction of the top surface of the tablet PC 200, the first fulcrum B1 locates on the edge of the right side surface of the dock 100 which contacts with the tablet PC 200. On the other hand, if the first force bearing point A1 acts on the left side end part in a longitudinal direction of the top surface of the tablet PC 200, the first fulcrum B1 locates on the edge of the left side surface of the dock 100 which contacts with the tablet PC 200.

A minimal width W of the dock 100 from the connector 102 to a rear end part of the dock 100 is determined by balancing moment of forces on a second fulcrum B2 according to the second acting force F2, a gravity of the dock 100, the gravity of the tablet PC 200 and a height (i.e. width) of the tablet PC 200 in a condition that the tablet PC 200 and the dock 100 as a whole do not rotate (step S305). The second fulcrum B2 locates on a rear edge of a bottom surface of the dock 100.

With the above method, the length size of the dock 100 and the width size of the dock 100 from the connector 102 to the rear end part of the dock 100 for stably laying the tablet PC 200 can be determined accurately, thereby the manufacturing cost of the dock 100 is reduced greatly.

Further, as shown in FIG. 4, a distance D from the connector 102 to the front end part of the dock 100 is predetermined by a designer according to designing requirements. For example, the distance D can be 17 mm. Thus, the minimal width W' of the dock 100 is W'=W+D. Further, the thickness T of the dock also can be predetermined by the designer according to designing requirements. For example, the thickness T of the dock can be 17.5 mm.

Figure 8:
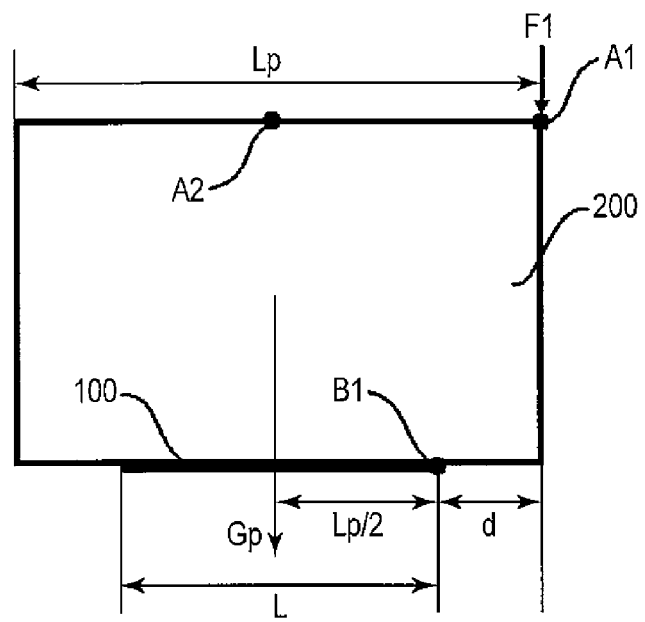
FIG. 8 shows an exemplary front view of a structure that a tablet PC and a dock are assumed to be planes according to the third embodiment.
Figure 9:
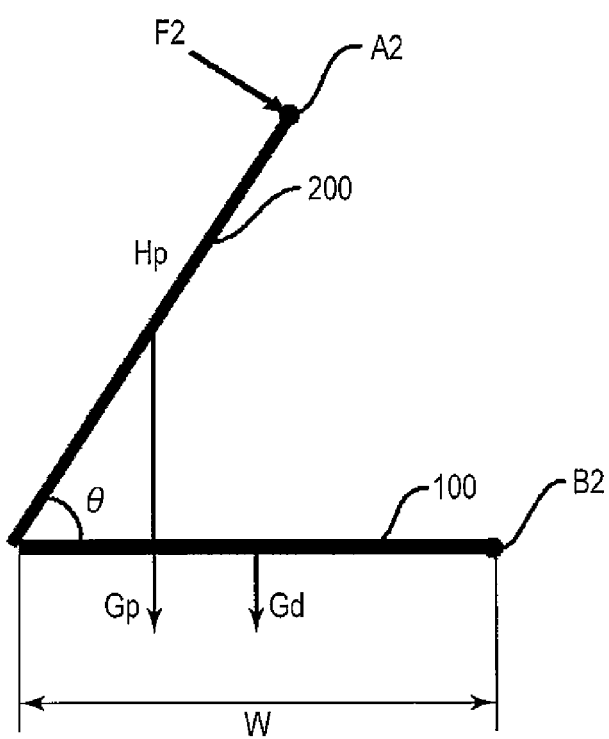
FIG. 9 shows an exemplary side view of a structure that a tablet PC and a dock are assumed to be planes according to the third embodiment.

Hereinafter, the third embodiment of the method for determining the size of the dock 100 used for the tablet PC 200 will be further described with reference to FIGS. 8-10. FIG. 8 shows an exemplary front view of a structure that the tablet PC 200 and the dock 100 are assumed to be planes according to the present embodiment. FIG. 9 shows an exemplary side view of the structure that the tablet PC 200 and the dock 100 are assumed to be planes according to the present embodiment. FIG. 10 shows a flow chart for further determining the size of the dock 100 according to the third embodiment of the present embodiment.

As shown in FIG. 10, the method for determining the size of the dock 100 used for the tablet PC 200 further comprises following steps:

The tablet PC 200 is assumed to be a first plane (step S401), and the first plane is a plane that is parallel to the back surface of the tablet PC 200 and on which a central plane in a longitudinal direction of the connector 102 locates. As shown in FIG. 8, the first plane is a rectangle shape which has an up edge, a down edge and two side edges.

The dock 100 is assumed to be a second plane (step S401), and the second plane is a plane that includes the top surface of the dock 100. As shown in FIG. 9, an angle between the first plane and the second plane is an acute angle θ, and the second plane is a rectangle shape which has a front edge, a back edge and two side edges. The front edge of the second plane is overlapped with the down edge of the first plane.

Then, as shown in FIG. 8, the first acting force F1 in a vertically downward direction is applied by using an end point of the up edge of the first plane as the first force bearing point A1 (step S402). The first force bearing point A1 can be the left end point of the up edge of the first plane, or can be the right end point of the up edge of the first plane. In present embodiment, as shown in FIG. 8, the first force bearing point A1 is the right end point of the up edge of the first plane. Next, the minimal length of the dock 100 is determined by balancing the moment of forces, by using an end point of the front edge of the second plane as the first fulcrum B1, and the end point of the front edge of the second plane and the end point of the up edge of the first plane being in a same side (step S404).

As shown in FIG. 8, when the first forcing bearing point A1 on the first plane which is the tablet PC 200 is suffered the first acting force F1 in the vertically downward direction, the first plane will rotate with respect to the second plane which is the dock 100 by using the first fulcrum B1 as a rotation point. Therefore, in order to make the first plane not rotate with respect to the second plane when the first forcing bearing point A1 on the first plane which is the tablet PC 200 is suffered the first acting force F1 in the vertically downward direction. The sum of the moment (ΣM1) at the first fulcrum B1 is at least equal to zero, that is, F1·d+Gp·L/2=0. Further, since L/2+d=Lp/2, the minimal length of the dock 100 is at least equal to F1·Lp/(Gp+F1). In other words, in order to make the first plane not rotate with respect to the second plane when the first forcing bearing point A1 on the first plane which is the tablet PC 200 is suffered the first acting force F1 in the vertically downward direction, the minimal length L of the dock 100 must be equal to or larger than F1·Lp/(Gp+F1). Wherein, Lp indicates the length of the tablet PC 200, and Gp indicates the gravity of the tablet PC 200.

Here, taking the table PCs 200 with types of Blade, Antares, Rhodes and Scorpio II in Table 1 for examples, the minimal length L of the dock 100 will be described in a condition that the magnitude of the first acting force F1 applied by the user is set to be 800 gf.

When the table PCs 200 with types of Blade, Antares, Rhodes and Scorpio II use different docks 100 suitable for respective table PC, the minimal length L1 of the dock 100 which is suitable for the tablet PC 200 with the type of Blade is at least 149.8 mm, the minimal length L2 of the dock 100 which is suitable for the tablet PC 200 with the type of Antares is at least 132.2 mm, the minimal length L3 of the dock 100 which is suitable for the tablet PC 200 with the type of Rhodes is at least 138.4 mm, and the minimal length L4 of the dock 100 which is suitable for the tablet PC 200 with the type of Scorpio II is at least 150.4 mm.

When the table PCs 200 with types of Blade, Antares, Rhodes and Scorpio II commonly use a same dock 100, the minimal length L of the dock 100 is L≥Lmax=L4=150.4 mm.

Further, as shown in FIG. 9, the second acting force F2 in a direction that is perpendicular to the first plane is applied by using a middle point of the up edge of the first plane as the second force bearing point A2 (step S403). In present embodiment, the direction of the second acting force F2 is in a direction that is perpendicular to the first plane, that is, an angle that the second acting force F2 intersects with the first plane is 90°. However, embodiments are not limited thereto. For example, the angle that the second acting force F2 intersects with the first plane can be larger than 90° or smaller than 90°.

Further, the minimal width of dock 100 from the connector 102 to the rear end part of the dock 100 is determined by balancing moment of forces, by using the back edge of the second plane as the second fulcrum B2 (step S405).

As shown in FIG. 9, when the second forcing bearing point A2 on the first plane which is the tablet PC 200 is suffered the second acting force F2 in the direction that is perpendicular to the first plane, the first plane and the second plane as a whole will rotate by using the second fulcrum B2 as a rotation point. Therefore, in order to make the first plane and the second plane as a whole do not rotate when the second forcing bearing point A2 on the first plane which is the tablet PC 200 is suffered the second acting force F2 in the direction that is perpendicular to the first plane, the sum of the moment (ΣM2) at the second fulcrum B2 is at least equal to zero, that is, F2·Hp·sin 75°+Gp·(W−Hp/2·cos 75°)+Gd·W/2=0. Therefore, the minimal width W of dock 100 from the connector 102 to the rear end part of the dock 100 is at least equal to (Gp·Hp·cos θ−2·F2·Hp·sin θ)/(Gd+Gp)L. In other words, the minimal width W of dock 100 from the connector 102 to the rear end part of the dock 100 must be equal to or larger than $(Gp \cdot Hp \cdot \cos\theta - 2 \cdot F2 \cdot Hp \cdot \sin\theta)/(Gd+Gp)L$, wherein, Gd indicates the gravity of the dock 100, Gp indicates the gravity of the tablet PC 200, Hp indicates the height (width) of the tablet PC 200.

Here, taking the table PCs 200 with types of Blade, Antares, Rhodes and Scorpio II in Table 1 for examples, the minimal width W of dock 100 from the connector 102 to the rear end part of the dock 100 will be described in a condition that the magnitude of the second acting force F2 applied by the user is set to be 800 gf, the weight of the dock 100 is set to be 200 gf and the angle θ is set to be 75°.

When the table PCs 200 with types of Blade, Antares, Rhodes and Scorpio II use docks 100 suitable for respective table PC, the minimal width W1 of dock 100 from the connector 102 to the rear end part of the dock 100 which is suitable for the tablet PC 200 with the type of Blade is at least 57.6 mm, the minimal width W2 of dock 100 from the connector 102 to the rear end part of the dock 100 which is suitable for the tablet PC 200 with the type of Antares is at least 49.6 mm, the minimal width W3 of dock 100 from the connector 102 to the rear end part of the dock 100 which is suitable for the tablet PC 200 with the type of Rhodes is at least 48.9 mm, and the minimal width W4 of dock 100 from the connector 102 to the rear end part of the dock 100 which is suitable for the tablet PC 200 with the type of Rhodes is at least 86.8 mm.

When the table PCs 200 with types of Blade, Antares, Rhodes and Scorpio II commonly use a same dock 100, the minimal width W of dock 100 from the connector 102 to the rear end part of the dock 100 which is suitable for the tablet PC 200 is W≥Wmax=W4=86.8 mm.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for determining a size of an electronic apparatus used for an external apparatus, the electronic apparatus comprising
   a connector for electrically connecting to the external apparatus, and
   a leaning supporting plate for supporting a back surface of the external apparatus when a bottom part of the external apparatus is mounted on the electronic apparatus via the connector,
   the method comprising:
   defining the external apparatus to comprise a first plane parallel to the back surface of the external apparatus and on which a central plane in a longitudinal direction of the connector is located, the first plane being a rectangle shape which has an up edge, a down edge, and two side edges;
   defining the electronic apparatus to comprise a second plane that includes the top surface of the electronic apparatus, an angle between the first plane and the second plane being an acute angle θ, the second plane being a rectangle shape which has a front edge, a back edge, and two side edges, the front edge of the second plane overlapping with the down edge of the first plane;
   determining a length of the electronic apparatus by balancing moment of forces on a first fulcrum, based at least in part upon a first acting force, a gravity of the external apparatus, and a length of the external apparatus, such that the external apparatus does not rotate with respect to the electronic apparatus, the first fulcrum being located on an edge of a side surface of the electronic apparatus which contacts the external apparatus at a side on which the first acting force is located, and wherein the determination comprises:
   using an end point of the up edge of the first plane as a first force bearing point, applying the first actin force F1 in a vertically downward direction, and determining the length L of the electronic apparatus according to the formula $L \geq F1 \cdot Lp/(Gp+F1)$ by balancing the moment of forces, by using an end point of the front edge of the second plane as the first fulcrum, the end point of the front edge of the second plane and the end point of the up edge of the first plane being in a same side, wherein Lp indicates the length of the external apparatus, and Gp indicates the gravity of the external apparatus.

2. The method of claim 1, further comprising:
   using a middle point of the up edge of the first plane as the second force bearing point, applying a second acting force F2 in a direction that is perpendicular to the first plane, and determining the width W of the electronic apparatus from the connector to the rear end part of the electronic apparatus according to the formula $W \geq (Gp \cdot Hp \cdot \cos\theta - 2 \cdot F2 \cdot Hp \cdot \sin\theta)/(Gd+Gp)$ by balancing the moment of forces, by using the back edge of the second plane as the second fulcrum, wherein Gd indicates the gravity of the electronic apparatus, Gp indicates the gravity of the external apparatus, and Hp indicates the height of the external apparatus.

3. A method for determining a size of an electronic apparatus used for an external apparatus, the electronic apparatus comprising
   a connector for electrically connecting to the external apparatus, and
   a leaning supporting plate for supporting a back surface of the external apparatus when a bottom part of the external apparatus is mounted on the electronic apparatus via the connector,
   the method comprising:
   defining the external apparatus to comprise a first plane parallel to the back surface of the external apparatus and on which a central plane in a longitudinal direction of the connector is located, the first plane being a rectangle shape which has an up edge, a down edge, and two side edges;
   defining the electronic apparatus to comprise a second plane that includes the top surface of the electronic apparatus, an angle between the first plane and the second plane being an acute angle θ, the second plane being a rectangle shape which has a front edge, a back edge, and two side edges, the front edge of the second plane overlapping with the down edge of the first plane;
   determining a width of the electronic apparatus from the connector on a front part of the electronic apparatus to a rear end part of the electronic apparatus by balancing moment of forces on a second fulcrum, based at least in part upon a second acting force, a gravity of the electronic apparatus, a gravity of the external apparatus, and a length of the external apparatus such that the external apparatus and the electronic apparatus as a whole do not rotate, the second fulcrum being located on a rear edge of a bottom surface of the electronic apparatus, and wherein the determination comprises:

using a middle point of the up edge of the first plane as the second force bearing point, applying the second acting force F2 in a direction that is perpendicular to the first plane, and determining the width W of the electronic apparatus from the connector to the rear end part of the electronic apparatus according to the formula $W \geq (Gp \cdot Hp \cdot \cos \theta - 2 \cdot F2 \cdot Hp \cdot \sin \theta)/(Gd+Gp)$ by balancing the moment of forces, by using the back edge of the second plane as the second fulcrum, wherein Gd indicates the gravity of the electronic apparatus, Gp indicates the gravity of the external apparatus, and Hp indicates the height of the external apparatus.

4. An electronic apparatus used for an external apparatus, the electronic apparatus comprising a connector for electrically connecting to the external apparatus, and a leaning supporting plate for supporting a back surface of the external apparatus when a bottom part of the external apparatus is mounted on the electronic apparatus via the connector, having a size determined by a method comprising:

defining the external apparatus to comprise a first plane parallel to the back surface of the external apparatus and on which a central plane in a longitudinal direction of the connector is located, the first plane being a rectangle shape which has an up edge, a down edge, and two side edges;

defining the electronic apparatus to comprise a second plane that includes the top surface of the electronic apparatus, an angle between the first plane and the second plane being an acute angle $\theta$, the second plane being a rectangle shape which has a front edge, a back edge, and two side edges, the front edge of the second plane overlapping with the down edge of the first plane;

determining a length of the electronic apparatus by balancing moment of forces on a first fulcrum, based at least in part upon a first acting force, a gravity of the external apparatus, and a length of the external apparatus, such that the external apparatus does not rotate with respect to the electronic apparatus, the first fulcrum being located on an edge of a side surface of the electronic apparatus which contacts the external apparatus at a side on which the first acting force is located, and wherein the determination comprises:

using an end point of the up edge of the first plane as the first force bearing point, applying the first actin force F1 in a vertically downward direction, and determining the length L of the electronic apparatus according to the formula $L \geq F1 \cdot Lp/(Gp+F1)$ by balancing the moment of forces, by using an end point of the front edge of the second plane as the first fulcrum, the end point of the front edge of the second plane and the end point of the up edge of the first plane being in a same side, wherein Lp indicates the length of the external apparatus, and Gp indicates the gravity of the external apparatus.

* * * * *